United States Patent [19]

Parten

[11] 4,397,798
[45] Aug. 9, 1983

[54] METHOD OF FORMING LAMINATED FOAM COUNTER AND TABLE TOPS

[75] Inventor: Bruce D. Parten, Greenbrier, Ark.

[73] Assignee: Polyvend Inc., Conway, Ark.

[21] Appl. No.: 204,748

[22] Filed: Nov. 7, 1980

[51] Int. Cl.³ .............................................. B29D 27/04
[52] U.S. Cl. .................................. 264/46.5; 249/164; 249/165; 264/46.6; 264/46.7; 264/129; 264/138; 264/155; 425/DIG. 29
[58] Field of Search ................. 264/46.5, 46.6, 46.4, 264/46.7, 138, 155, 129; 425/89, DIG. 29; 249/164, 165

[56] References Cited

U.S. PATENT DOCUMENTS

| | | | |
|---|---|---|---|
| 3,487,134 | 12/1969 | Burr | 264/46.6 |
| 3,546,841 | 12/1970 | Smith et al. | 264/46.5 X |
| 3,608,007 | 9/1971 | Henrikson | 264/46.5 X |
| 3,773,875 | 11/1973 | Lammers | 264/46.6 X |
| 3,786,121 | 1/1974 | Schaerer | 264/46.6 X |
| 3,816,573 | 6/1974 | Hashimoto et al. | 264/46.5 |
| 3,845,183 | 10/1974 | Harrison | 264/46.6 |
| 3,873,407 | 3/1975 | Kumata et al. | 264/46.6 X |
| 3,971,112 | 7/1976 | Amato et al. | 264/46.6 X |
| 4,032,683 | 6/1977 | Coale | 264/129 X |
| 4,134,942 | 1/1979 | Mirr et al. | 264/46.6 X |
| 4,153,657 | 5/1979 | Wilcox | 264/46.6 |
| 4,156,516 | 5/1979 | Oliver | 425/89 X |
| 4,259,274 | 3/1981 | Tiitola | 264/46.5 |

FOREIGN PATENT DOCUMENTS

| | | | |
|---|---|---|---|
| 627525 | 5/1963 | Belgium | 264/46.6 |
| 2738875 | 3/1979 | Fed. Rep. of Germany | 264/46.6 |
| 1164827 | 10/1958 | France | 264/46.7 |
| 1313980 | 11/1961 | France | 264/46.5 |
| 46-7833 | 9/1972 | Japan | 264/46.6 |
| 55-39353 | 3/1980 | Japan | 264/46.5 |
| 55-51540 | 4/1980 | Japan | 264/46.6 |
| 1139196 | 1/1969 | United Kingdom | 264/46.5 |

*Primary Examiner*—Philip E. Anderson
*Attorney, Agent, or Firm*—Hill, Van Santen, Steadman, Chiara & Simpson

[57] ABSTRACT

An inventive method for producing a laminated molded countertop includes the steps of placing the surface laminate material into a mold, applying a layer of polyurethane foam to an interior side of the laminate material, applying a reinforcing member, if necessary, on top of the layer of polyurethane foam, applying a second layer of polyurethane foam over the reinforcing member and closing the mold. A resultant molded article has an exterior surface laminated thereto due only to the forces generated by the polyurethane foam during the time when it is expanding and solidifying.

10 Claims, 11 Drawing Figures

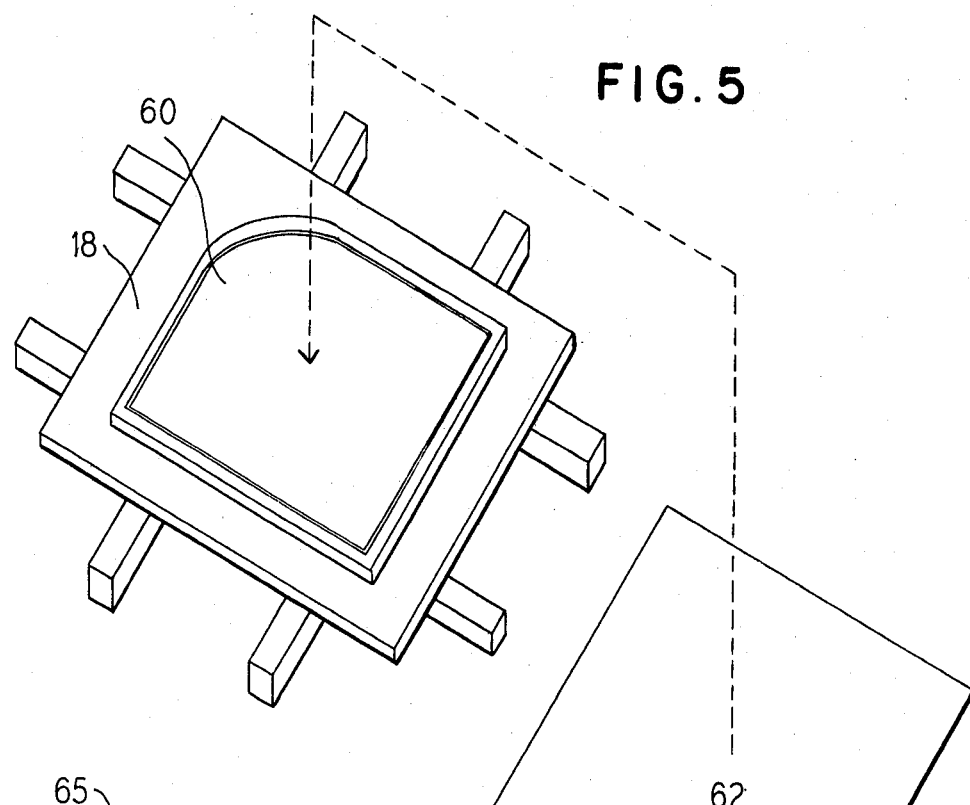
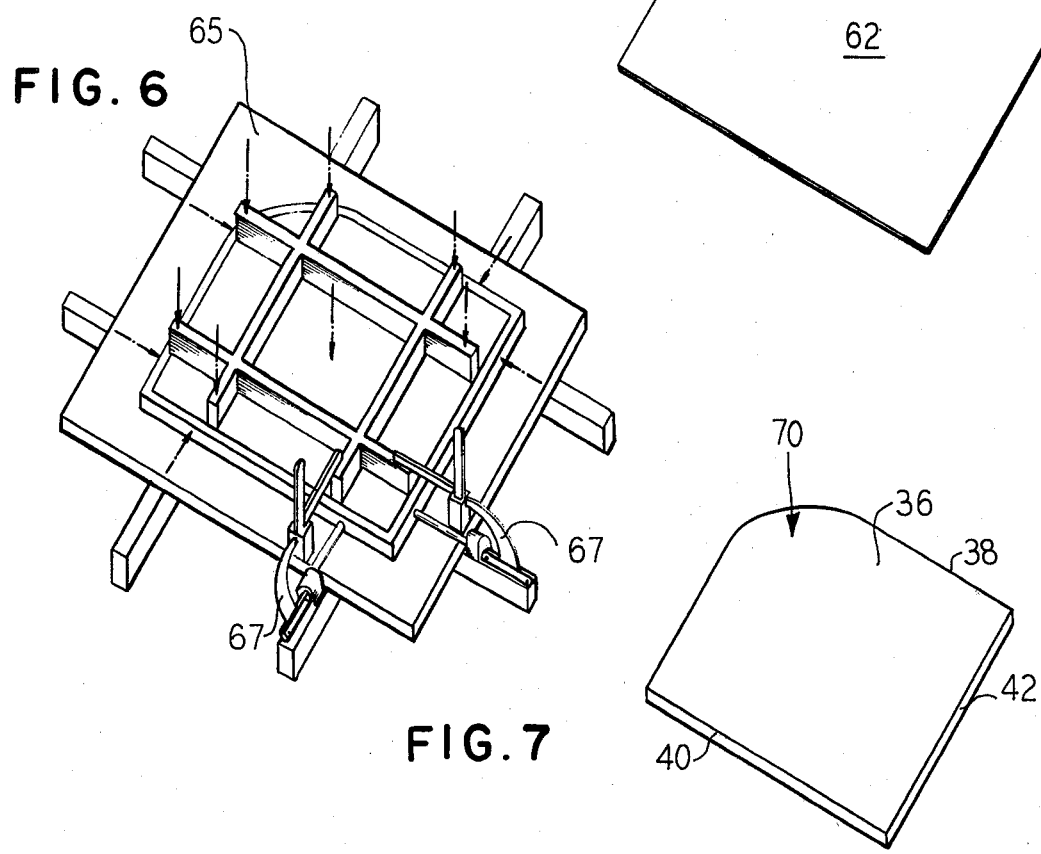
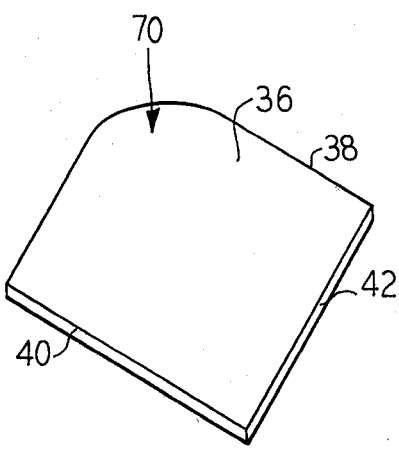

METHOD OF FORMING LAMINATED FOAM COUNTER AND TABLE TOPS

BACKGROUND OF THE INVENTION

1. Field of the Invention

The invention pertains to a method of fabricating a countertop or other object which has an outer, finished, laminated surface.

2. Description of the Prior Art

It has been known to make countertops by laminating sheets of FORMICA onto previously curved or formed materials such as wood or fiber board.

There has been a continual need to be able to fabricate laminated countertops or other objects with an exterior laminated surface having arbitrary shapes and with a reduced labor charge for forming the underlying wood or fiber board material.

SUMMARY OF THE INVENTION

The invention includes an improved method of forming a countertop or other object which has an outer laminated surface, such as a FORMICA surface, bonded to a shaped inner supporting member. In the inventive method, the outer finished layer, such as a FORMICA layer, is first placed around the exterior edges or surfaces of a mold. Subsequently, a two-part expanding polyurethane foam is spread or sprayed on the interior surfaces of the FORMICA laminate material. If desired, reinforcing material such as shaped pieces of plywood, metal rods and/or metal plates can be placed on the layer of mixed polyurethane foam previously applied to the interior surfaces of the laminate material. Finally, a final layer of mixed two-part polyurethane foam is applied over the reinforcing members essentially covering them completely. If desired as a next step, a flexible bottom layer to be laminated to the two-part polyurethane foam such as paper or fiberglass can then be placed over the foam material. Finally, the mold is closed and clamped shut for a duration of time necessary to permit the polyurethane foam to chemically react, expand and solidify. After the two-part polyurethane foam material has expanded and solidified, the mold is opened and the completed laminated article is removed. If desired, holes for screws or to pass electrical wires through the cabinetry can then be cut into the completed article at selected locations. As a final step once the countertop has been drilled, the exposed drilled or cut polyurethane foam material can be sealed by spraying or painting those cut or drilled surfaces with a urethane elastomer. The urethane elastomer coating reseals the drilled or cut polyurethane foam and makes it moisture impervious.

An article of manufacture produced by the inventive method has an exterior surface or surfaces formed by a selected thin material such as FORMICA or other suitable laminate materials. The article has an interior or body region which is formed from the rigid two-part expanded polyurethane foam. The interior body portion may include reinforcing members such as plywood, metal rods, plates either alone or in combination with blocks, metal tapped bolt anchors and/or studs anchored into the polyurethane foam.

A bottom surface of the completed article can also include a covering such as fiber glass or paper or even another FORMICA surface which is laminated to the polyurethane foam as is the exterior finished surfaces.

Because the polyurethane foam is confined within enclosed mold during the time it is expanding and solidfying, it rigidly bonds itself to the exterior laminate materials. Further, because the polyurethane foam expands as a result of the chemical reaction involved, it spreads evenly throughout the mold, completely filling all portions thereof. The mold can thus be of essentially any arbitrary shape. The only requirement being that it is possible to place the laminate material along the external surfaces of the mold prior to applying the two-part polyurethane foam to the mold.

It has been found desirable where the pieces of FORMICA come together to include a step of taping the pieces of FORMICA together, along the interior surfaces thereof, to prevent the polyurethane foam from leaking between the pieces of FORMICA while it is expanding and hardening. The prefered method is to apply the tape to the exterior portion and/or to hot melt the pieces of FORMICA material from the inside along the edges of each piece.

DESCRIPTION OF THE FIGURES

FIG. 5 is a diagrammatic representation of yet another step of my inventive method.

FIG. 6 is a diagrammatic representation of the final step of my inventive method.

FIG. 7 is a perspective view of a completed laminated article formed according to my inventive method.

DETAILED DESCRIPTION OF THE PREFERRED EMBODIMENTS

Not by way of limitation, but by way of disclosing the best mode and by way of enabling one of skill in the art to practice my invention, there are disclosed in FIGS. 1 through 6 my inventive method, as well as several embodiments of articles manufacturable with my inventive method.

Figure 1:
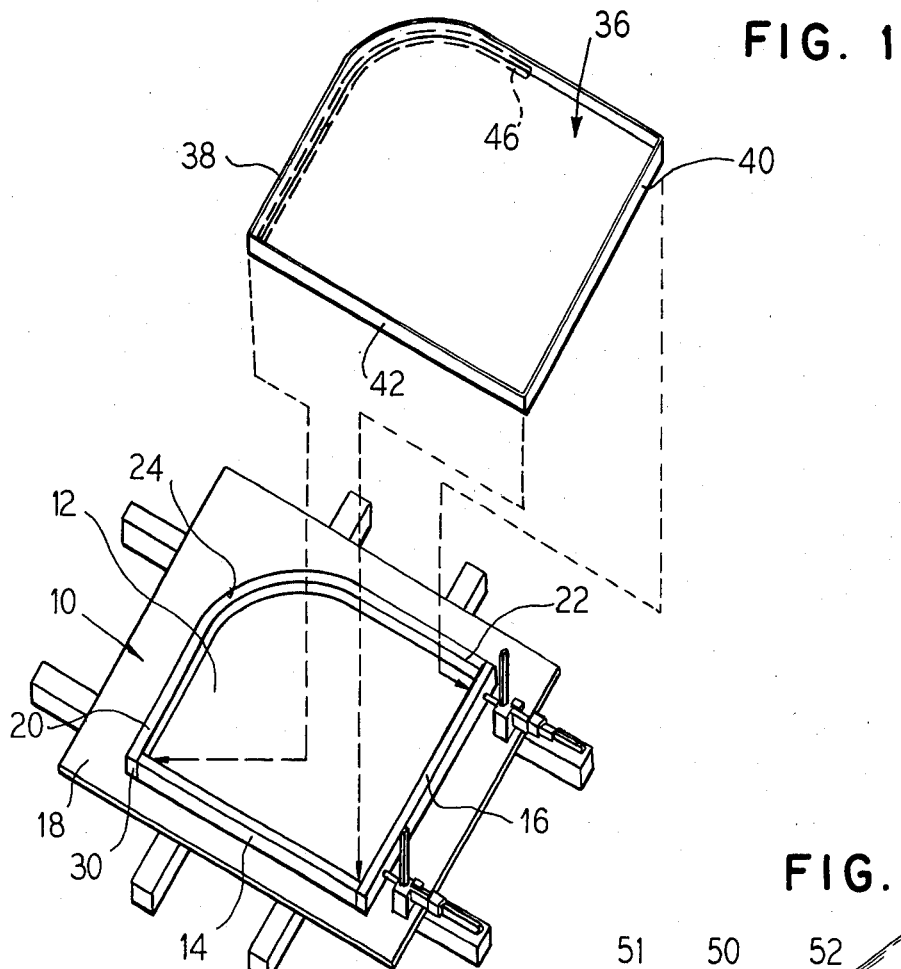
FIG. 1 is a diagrammatic representation of the first step of my inventive method.

FIG. 1 shows a portion of a mold 10 which is shaped and adapted to be used to create a countertop of an essentially uniform thickness with exterior top and side laminated surfaces covered with a material such as FORMICA. While I have achieved good results with materials such as FORMICA or its equivalent, it will be understood that my method is adapted to be used with any thin exterior laminate type material. The mold 10 is formed with a flat interior region 12, two rigid elongated side members 14 and 16 which define two of the edges of the region 12 and which are mounted on a mold plate 18. The region 12 is also bounded by two additional elongated rigid members 20, 22 which are joined by a curved region 24. The members 20, 22 intersect the members 14, 16 forming square corners, such as the corner represented by 30.

Into the lower portion of the mold 10 are placed several pre-cut pieces 36, 38, 40 and 42 which are to form the exterior top and sides of the completed article. The piece of material 36 is cut essentially to conform to the shape of the region 12. Each of the laminate pieces 38 through 42 is cut to conform to an interior surface of an adjacent member 14, 16, 20, 22 or 24.

The laminate members 36 through 42 can be taped together along exterior surfaces as indicated in FIG. 1 by pieces of tape 46 to provide a seal between the members 36 through 42 to prevent the two-part polyurethane foam from leaking therebetween while it is expanding and hardening.

Figure 2:
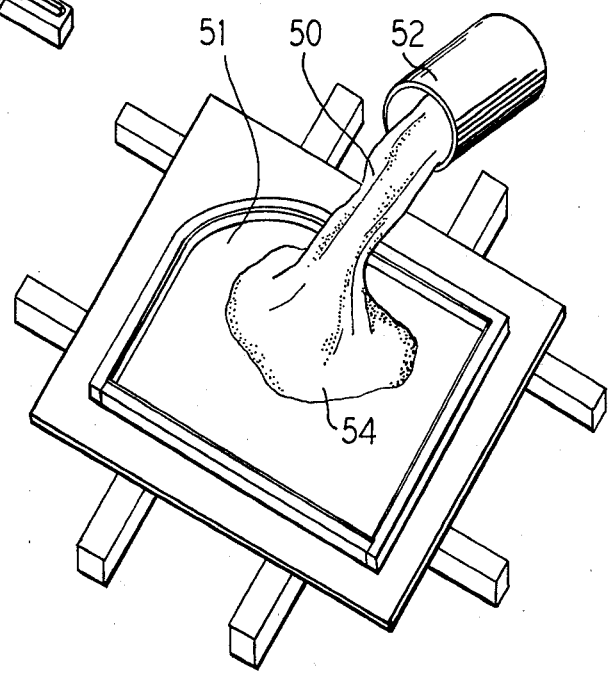
FIG. 2 is a digrammatic representation of the next step of my inventive method.

FIG. 2 discloses the next step of my method, wherein a layer of two-part polyurethane foam 50 is applied to interior surfaces of the laminate material such as the interior surface 51 of the sheet 36. FIG. 2 shows the pre-mixed material 50 being poured from a mixing container 52. Alternately, instead of pre-mixing the two-part polyurethane foam in a container such as 52 and then applying it to the interior surface of the member 36, it would be possible to use commercially available spray guns which are adapted to simultaneously mix and spray two-part materials such as the two-part polyurethane foam used in my invention and spray a layer of foam on the interior surfaces of the members 36 through 42.

Figure 3:
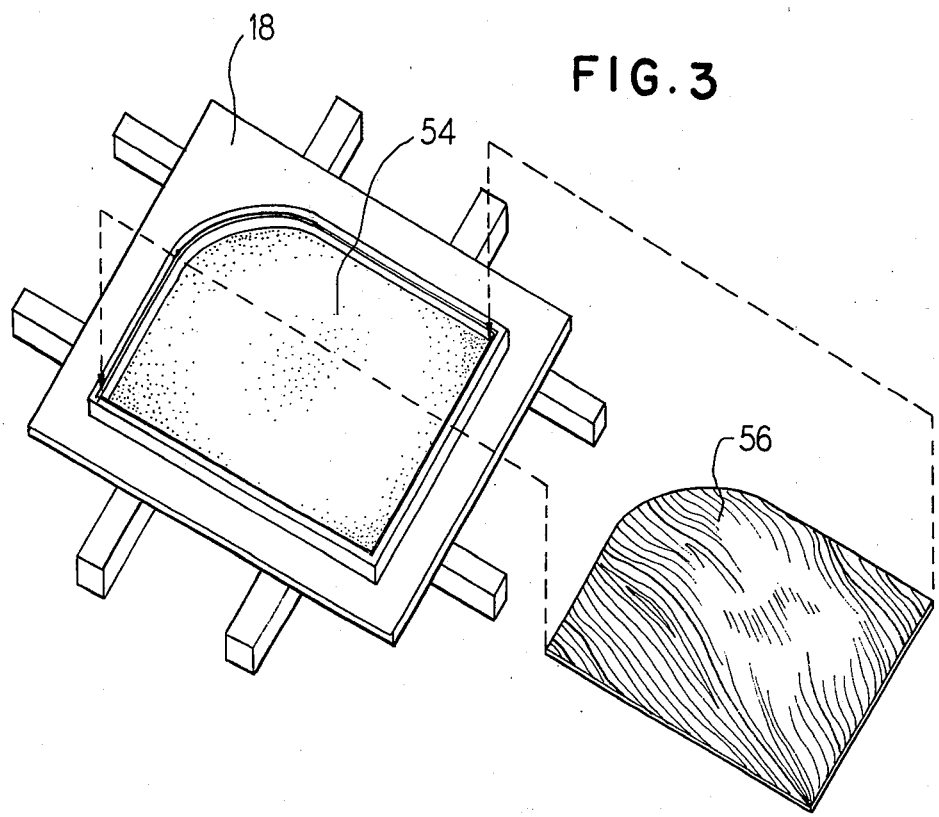
FIG. 3 is a diagrammatic representation of the next step of my inventive method.

Once a layer of foam has been applied to the interior surfaces of the members 36 through 42 a reinforcing member 56, as shown in FIG. 3 can be placed over the applied or sprayed layer 54. The member 56 is cut so it has approximately the shape of the region 12 but is slightly smaller than the region 12.

I have found that plywood makes a very effective reinforcing material. Additionally, metal bars or plates with or without plywood members such as 56 could also be used.

Figure 4:
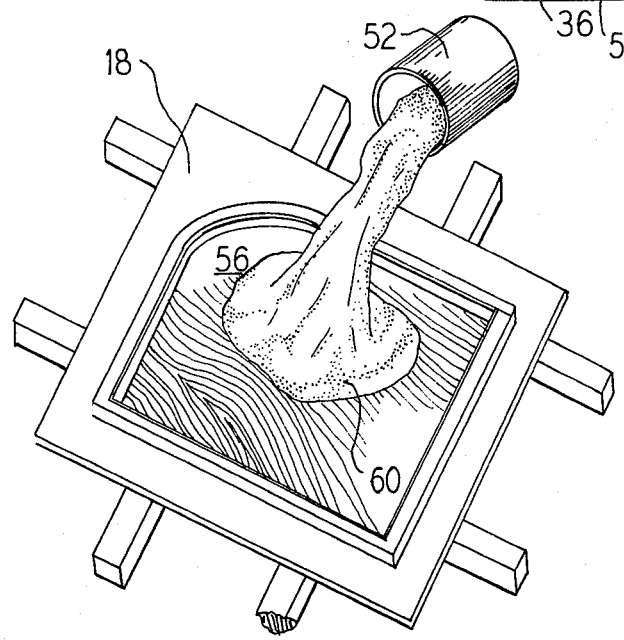
FIG. 4 is a diagrammatic representation of the next step of my inventive method.

As shown in FIG. 4, a second layer of pre-mixed two-part polyurethane foam 60 is either poured out of the container 52 and spread about over the reinforcing material 56 or as noted previously could be sprayed over the material 56.

As shown in FIG. 5, a bottom laminate layer 62 such as paper or fiber glass or even another piece of FORMICA such as 36 is applied over the second layer of two-part polyurethane foam 60.

Subsequently, as shown in FIG. 6, a cover 65 is placed over the lower part of the mold 10 and clamped to the member 10 using clamps 67 as shown. The mold is clamped shut for the time period necessary for the two-part polyurethane foam to expand and rigidify or cure which is on the order of 20 to 25 minutes.

Subsequently, the mold is opened, and the completed article 70 is removed therefrom as shown in FIG. 7. The completed laminated article 70 as shown in FIG. 7 has a central body portion formed from the expanded two-part polyurethane foam to which is laminated members 36 through 42 originally inserted into the mold as shown in FIG. 1. The laminated surface layers 36 through 42 are bonded to the rigid cured body portion of the article 70 due to the forces exerted by the two-part polyurethane foam as the foam attempted to expand while it was within the mold having the first part 10 and the second part 65. The enclosed region formed from the mold parts 10, 65 corresponds essentially to the final shape of the article 70.

Figure 8:
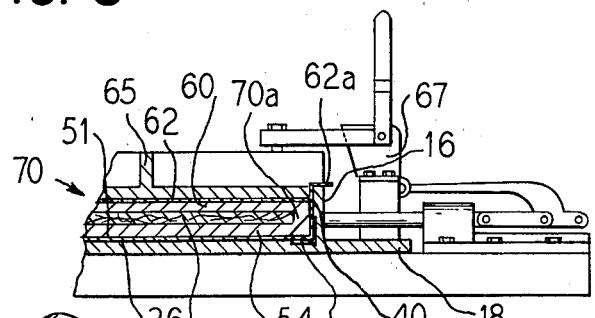
FIG. 8 is a fragmentary sectional view showing the structure of the body portion, including an inventive reinforcing member within one of my laminated articles.

FIG. 8 shows a sectional view of a portion of the article 70 while the article 70 is still retained within the region formed by the mold parts 10 and 65. As can be seen from FIG. 8, the exterior surface members such as 36 and 40 are forced by the expanding polyurethane foam layers 54 and 60 against interior surfaces of the mold bottom plate 18 and side member 16. The reinforcing piece of plywood 56 is sandwiched between the rigid shaped layers 54, 60 of the polyurethane foam. Since the member 56 is slightly smaller than the interior region 12 formed by the mold, a quantity of the polyurethane foam 70a expands around the end of the reinforcing member 56 thereby fully encapsulating the member 56 within the polyurethane body of the article 70. Also as can be seen in FIG. 8, the tape 46 seals the seam between the surface layers 36 and 40. As a result, the polyurethane foam cannot leak between those two layers when it is expanding and hardening. Additionally shown in FIG. 8 is the bottom laminate layer 62 with an edge portion 62a which hangs over the top 65 of the mold 10. The portion 62a can be torn off or cut off of the completed article once the expanded two-part foam has cured and set.

Figure 9:
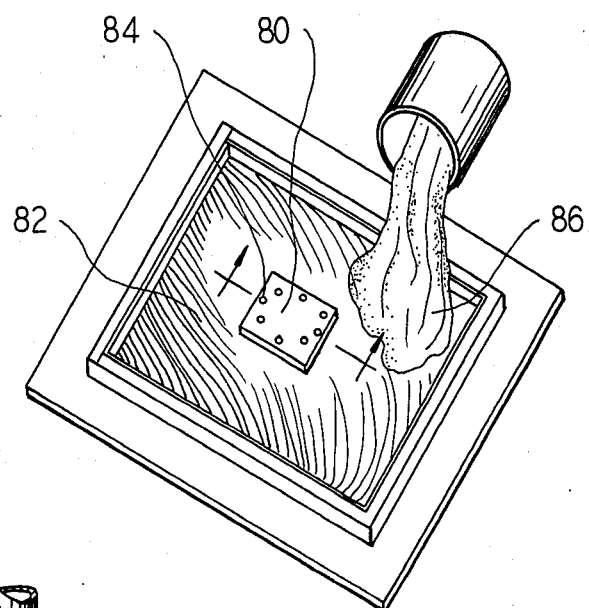
FIG. 9 is a diagrammatic alternate step in practicing my inventive method.

FIG. 9 shows an alternate reinforcing member 80 located on a previously inserted piece of plywood 82. The reinforcing member 80 could be metal or a sheet metal plate and can be fabricated with a series of threaded holes 84 for the purpose of receiving mounting bolts. A second layer 86 of polyurethane foam is shown in FIG. 9 being poured over the first layer 86a (see FIG. 10). The material 86 would flow around or be pushed up against the reinforcing member 80 by any convenient trowel or other type of mechanical tool.

Figure 10:
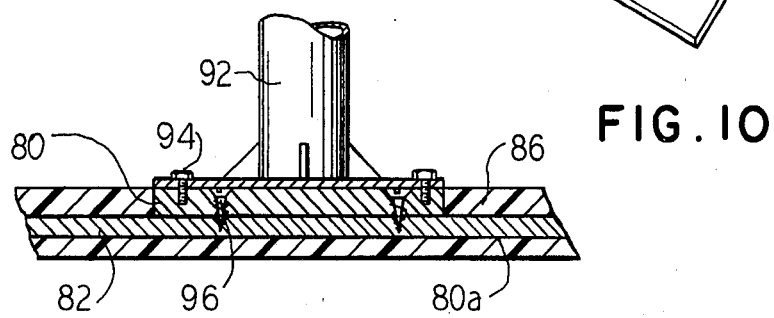
FIG. 10 is a fragmentary sectional view showing a supporting member attached to a laminated article produced using my inventive method.

As shown in FIG. 10, the completed article 90 formed with the reinforcing member 80 can be used as a bracket to which a support means such as leg 92 could be attached using screws or bolts 94 which engage the threading holes 84 of the plate 80. For additional security, the plate 80 can be screwed into the plywood board 82 by screws 96.

Figure 11:
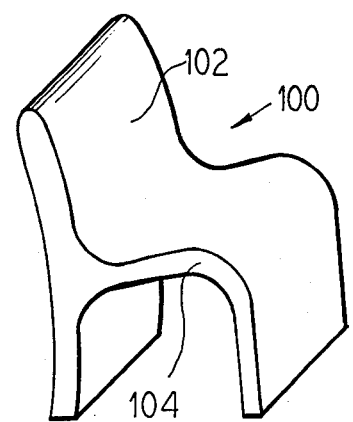
FIG. 11 is an alternate laminated article which can be produced using my inventive method.

FIG. 11 shows yet another article 100 which could be formed using my inventive method having a laminated exterior surface 102 and a central body portion 104 formed out of expanded two-part polyurethane foam.

I have found that $\frac{3}{8}$" thick plywood or $\frac{1}{4}$" plywood boards provide substantial additional strength when used as the reinforcing members.

Where a reinforcing member such as a piece of plywood or steel rods or a steel plate are used, I have found that two-part polurethane foam such as Texas Urethane type 100-40 which has a finished density of four pounds per cubic foot provides an adequately strong finished counter. For larger counters I have found that PPG type RS-67134 two-part polyurethane foam which has a finished density of 20 pounds per cubic foot is substantially stronger and can be used without an internally embedded reinforcing member.

Additionally, the completed countertops can be cut or drilled as desired for mounting or for passing electrical wires therethrough. To insure that the expanded and cured polyurethane foam continues to remain water-resistant along the cut or drilled surfaces, I have found it desirable to spray those surfaces or coat them with a urethane elastomer such as Futura Flex 500 STD or PC. After coating, I allow the laminated parts to dry for about 12 hours.

Some of the advantages of my new method include:

(1) It is possible to quickly and on assembly line basis rapidly make a large quantity of essentially identical laminated articles.

(2) By using the two-part expandable polyurethane foam which, because of the pressure it applies to the exterior surface members during the expansion process, bonds itself directly to those surface members, I have been able to substantially reduce the labor costs of making a countertop.

(3) Since only one mold is required and only for a relatively limited amount of time for each countertop, for example, when the Texas Urethane type 100-40 foam is used a curing time of less than ½ hour is more than adequate to permit the foam to expand and harden, the capital investment of using my method is relatively small.

This invention can be used in the manufacture of many types of furniture such as but not limited to desk, cabinet and table top.

While those skilled in the art might suggest various changes and modifications with respect to my inventive method and the resultant laminated article, it will be understood that I wish to include within the claims of the patent warranted hereon all such changes and modifications as reasonably come within my contribution to the art.

I claim as my invention:

1. A method of forming laminated articles of a selected shape with a selected laminated surface material using a preformed, openable, mold having at least two parts comprising the steps of:
    taping the pieces of the selected surface material together by applying tape on exterior surfaces thereof across adjacent edges of different pieces of surface material to prevent leakage of the expandable foam material therebetween while the expandable material is expanding and applying pressure to the surface material;
    placing the exteriorly taped surface material in the mold cavity of the first mold part;
    applying a first layer of mixed expandable foam material to at least a part of an interior surface of one piece of selected surface material within the first mold part;
    positioning the reinforcing member upon the first layer of mixed expandable foam;
    applying a second layer of mixed expandable foam over at least a portion of the reinforcing member;
    applying a layer of backing surface material over the second layer of expandable material in the first mold part before the mold is closed;
    closing the mold;
    clamping the mold closed for a selected time such that the expandable foam material fully expands throughout the mold, solidifies, cures and bonds to the interior surfaces of the selected surface material due to the pressure exerted by the expandable foam material on the interior surfaces of the selected surface material; and
    opening the mold and removing the completed, laminated article.

2. The method according to claim 1, including an additional step of mixing component parts of the expandable foam material to form a quantity of mixed expandable foam.

3. The method according to claim 2, wherein the step of mixing comprises placing the component parts of the expandable foam material into a mixing container and mixing the component parts with a mechanical agitator.

4. The method according to claim 3, wherein the step of applying a first layer comprises mechanically spreading a quantity of expandable foam material on the part of the interior surface of the selected surface material.

5. The method according to claim 4, wherein the step of applying a first layer comprises:
    supplying the components of the expandable foam material to an enclosed mixing chamber;
    mixing the components in the enclosed mixing chamber under pressure;
    spraying the mixed expandable foam material under pressure against the part of the interior surface of the selected surface material.

6. The method according to claim 1, including the further steps of:
    selectively drilling or cutting the completed, laminated article;
    coating the drilled or cut surfaces of the expanded foam material with a selected urethane elastomer.

7. A method of forming molded countertops of a selected size and shape with a thin surface material laminated thereto using a mold having at least two parts comprising the steps of:
    taping a plurality of pieces of the surface material together with the exterior sides oriented outwardly and with the tape placed on the exterior sides;
    placing the exteriorly taped pieces of surface material into the mold;
    applying a layer of mixed expandable foam material to at least a part of one interior side of the surface material in the mold;
    closing the mold for a selected time such that the expandable foam material fully expands throughout the mold, solidifies and bonds to the interior sides of the surface material due to the pressure exerted by the expanding foam material on the interior sides of the surface material;
    opening the mold and removing the completed laminated countertop;
    selectively drilling or cutting the completed, laminated countertop;
    and coating the drilled or cut surfaces of the expanded foam material with a selected urethane elastomer.

8. The method according to claim 7 wherein the step of applying comprises:
    supplying the components of the expandable foam material to an enclosed mixing chamber;
    mixing the components in the enclosed mixing chamber under pressure;
    spraying the mixed expandable foam material under pressure against the part of the interior surface of the selected surface material.

9. The method according to claim 7, including a further step of:
    applying a layer of backing surface material between the layer of expandable material in the first mold part, and the second mold part before the mold is closed.

10. The method according to claim 9, wherein the step of applying a layer of mixed expandable foam material comprises:
    applying a first layer of mixed expandable foam material to at least a part of an interior surface of one piece of selected surface material within the first mold part;
    positioning a reinforcing member upon the first layer of mixed expandable foam;
    applying a second layer of mixed expandable foam over at least a portion of the reinforcing member.

* * * * *